Figure 1:
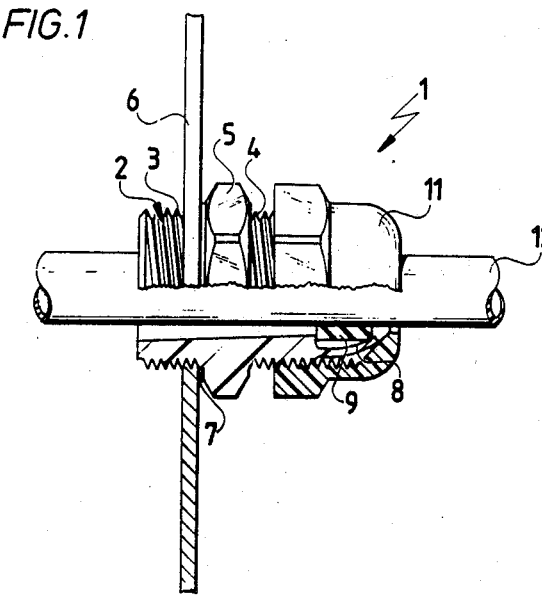

United States Patent [19]

Studenski

[11] Patent Number: 4,891,470
[45] Date of Patent: Jan. 2, 1990

[54] SCREW-TYPE CABLE FITTING

[75] Inventor: Udo Studenski, Villingen-Schwenningen, Fed. Rep. of Germany

[73] Assignee: U. I. Lapp KG, Stuttgart, Fed. Rep. of Germany

[21] Appl. No.: 240,923

[22] Filed: Sep. 6, 1988

[30] Foreign Application Priority Data

Sep. 12, 1987 [DE] Fed. Rep. of Germany ....... 3730686

[51] Int. Cl.[4] .......................................... H02G 15/007
[52] U.S. Cl. ................................... 174/65 SS; 285/915
[58] Field of Search ...................... 174/65 SS; 285/915

[56] References Cited

U.S. PATENT DOCUMENTS

| | | | |
|---|---|---|---|
| 2,617,672 | 11/1952 | Nichols | 285/915 X |
| 3,149,861 | 9/1964 | Larsson | 285/915 X |
| 3,325,195 | 6/1967 | Margis | 285/915 X |
| 3,667,783 | 6/1972 | Sotolongo | 174/65 SS |
| 3,801,131 | 4/1974 | Appleton | 285/159 |
| 4,250,348 | 2/1981 | Kitagawa | 174/65 SS |

FOREIGN PATENT DOCUMENTS

| | | |
|---|---|---|
| 2951395A1 | 2/1981 | Fed. Rep. of Germany . |
| OS3238438 | 10/1982 | Fed. Rep. of Germany . |
| 3322476A1 | 12/1983 | Fed. Rep. of Germany . |
| OS3420021 | 5/1984 | Fed. Rep. of Germany . |
| 3446494A1 | 7/1986 | Fed. Rep. of Germany . |

Primary Examiner—Leo P. Picard
Assistant Examiner—David A. Tone
Attorney, Agent, or Firm—Leydig, Voit & Mayer

[57] ABSTRACT

In a screw-type cable fitting for holding cables, edged grains consisting of hard, electrically insulating material, in particular, sand, are arranged on the clamping surface of a clamping part, for example, an elastic ring or a clamping cage, and dig into the cable sheath in a positively connected manner when pressed against the cable sheath.

9 Claims, 1 Drawing Sheet

U.S. Patent Jan. 2, 1990 4,891,470

SCREW-TYPE CABLE FITTING

The invention relates to a screw-type cable fitting for holding cables, leads, hoses or the like comprising a threaded socket, a cap nut and at least one clamping part which can be pressed against the sheath of the cable to be held by screwing the cap nut onto the threaded socket.

In known screw-type cable fittings of this kind, the clamping part is usually in the form of an elastic packing ring or a clamping cage. In order to hold the cable in the fitting with a predetermined force, it is necessary for the clamping part to be pressed with a high force against the cable sheath. In general, this pressing force can only be exerted by applying a wrench to the cap nut. This high pressing force may, however, damage the cable sheath and the insulation of the cores inside the cable and hence reduce the service life of the cable.

The object of the invention is to so improve a generic screw-type cable fitting that the cable is held with a predetermined force in the screw-type cable fitting although only a low pressure is applied by the clamping part.

In accordance with the invention, the object is achieved by edged rains consisting of hard, electrically insulating material, in particular, sand, being fixedly arranged on the surface of the clamping part which is pressed against the sheath of the cable when the cap nut is screwed on, and by these grains digging into the cable sheath in a positively connected manner when pressed against the cable sheath.

Therefore, in contrast with the prior art, the cable is clamped by a positive connection more so than by a frictional connection. With a given resistance of the cable to being pulled out of the cable fitting, the pressure applied by the clamping part can thereby be reduced to a considerable degree. In most cases, it will, therefore, be adequate for the cap nut to be tightened by hand only. On account of the low pressure applied to the cable sheath by the clamping part, the cores of the cable are capable of carrying out a compensating motion in the lengthwise direction, which increases the service life of the cables considerably, particularly cables which are frequently moved.

Figure 2:
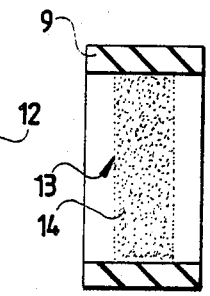
Figure 3:
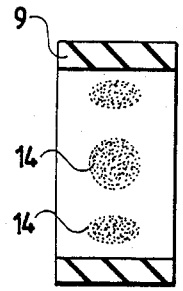
Figure 4:
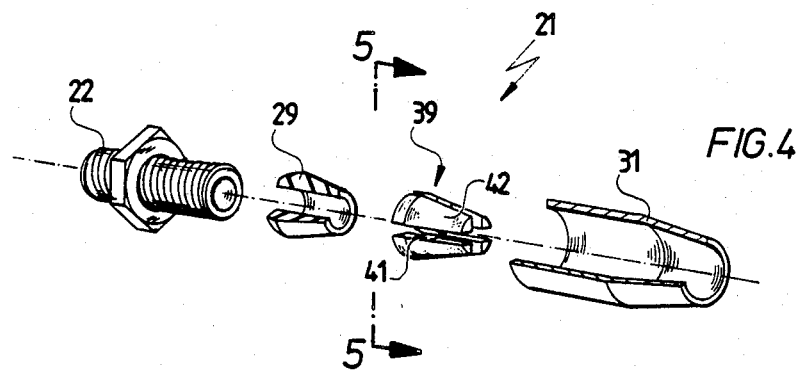
Figure 5:
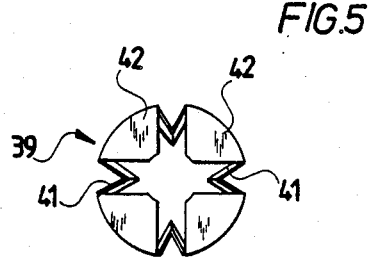

The following description of preferred embodiments serves in the conjunction with the appended drawings to explain the invention in further detail. The drawings show:

FIG. 1 a partly sectional view of a conventional screw-type cable fitting with a packing and clamping ring;

FIGS. 2 and 3 sectional views of packing and clamping rings;

FIG. 4 an exploded view of another screw-type cable fitting with a clamping cage; and FIG. 5 a view taken along line 5—5 in FIG. 4.

The screw-type cable fitting 1 shown in FIG. 1 comprises a circular-cylindrical threaded socket 2 with externally threaded sections 3,4 and a hexagonal member 5 located between these sections. By applying a wrench or the like to the hexagonal member 5, the threaded socket 2 can be screwed into the threaded opening of a wall 6 or the like. Packing rings 7 may be arranged between hexagonal member 5 and wall 6. The threaded socket 2 whose inner wall may be of slightly conical configuration terminates at its end remote from the wall 6 in clamping lamellae 8 which protrude axially them.

The clamping lamellae 8 enclose a clamping and packing ring 9 made of elastomeric material, for example, rubber. In the unpressed state, this ring 9 may have the shape of a hollow circular cylinder. A cap nut 11 with a conical inner surface is screwed onto the externally threaded section 4 of the threaded socket 2.

When the cap nut 11 is screwed sufficiently far onto the threaded section 4, the free ends of the clamping lamellae 8 engage the conical inner surface of the cap nut 11 and are pressed radially inwardly by it. The clamping and packing ring 9 is thereby likewise radially compressed and pressed against the sheath of a cable 12 extending through the screw-type cable fitting 1. On the one hand, this pressure seals the cable sheath in the screw-type cable fitting 1 and, at the same time, clamps the cable in the screw-type cable fitting 1. An electric lead, a hose, a rope or the like may take the place of the cable 12.

As shown in FIG. 2, the inner side of the hollow cylindrical clamping and packing ring 9 is coated in a ring-shaped section 13 with hard, edged grains 14 consisting of electrically insulating material, for example, sand (silicon dioxide or the like). When the cap nut 11 is screwed on and the ring 9 is pressed in a deforming manner against the sheath of the cable 12, the edged grains 14 dig into the sheath (and possibly into the elastomeric material of the ring 9) and thereby hold the cable in the fitting in a positively connected manner.

It is expedient for only section 13 on the inner side of the ring 9 to be provided with sand or the like as sand-free annular regions left on either side of section 13 are then free to exert their sealing effect on the cable 12 in an unimpeded manner.

As shown in FIG. 3, instead of a ring-shaped section 13, the inner side of the ring 9 may be coated with several small, separate areas of edged grains 14.

In another embodiment of a screw-type cable fitting 21 shown in an exploded illustration in FIG. 4, a cap nut 31 can be screwed onto a threaded socket 22 corresponding to the threaded socket 2 in FIG. 1. The threaded socket 22 does not have clamping lamellae. Instead, a so-called clamping cage consisting, for example, of plastic, is insertable in the conical part of the cap nut 31. The clamping cage 39 consists of four segments 42 which are movably joined to one another by spring-like parts 41. When the cap nut 31 is screwed onto the threaded socket 22, these segments 42 are compressed by the conical inside wall of the cap nut 31 and clamp a cable extending through the screw-type cable fitting 21. Those areas of the clamping cage 39 which come into clamping contact with the cable sheath are coated with edged grains consisting of hard, electrically insulating material, more particularly, sand, and dig into the cable sheath in a positively connected manner when pressed against the cable sheath.

In the embodiment shown in FIGS. 4 and 5, a packing ring 29 made of rubber or the like is arranged between the threaded socket 22 and the clamping cage 39. The packing ring 29 is supported, on the one hand, at the end face of the threaded socket 22 and, on the other hand, at the rear side of the clamping cage 39 and is made to sealingly engage the cable by means of compression when the cap nut 31 is screwed on.

The edged grains 14 may be adhesively connected to the clamping part in the form of an elastic ring 9 or a compressible clamping cage 39, and preferably only area-wise, as described with reference to FIGS. 2 and 3. It is also possible to dispose the grains, in particular, grains of sand, on a carrier material, for example, an adhesive tape or the like beforehand and to attach the carrier material to the clamping part (ring 9 or clamping cage 39). In another embodiment, the edged grains 14 may also be embedded directly in the material of the clamping part, for example, by mixing them into the base material from which the clamping part is molded. It is also possible to burn the grains 14 into the surface of the clamping part.

It has been found that the resistance of the cable 12 to being pulled out of the cable fitting 1 or 21 is substantially increased even if the grains 14 dig into the cable sheath to a depth of a few hundredths of a millimeter only. The cap nut 11, 31 needs only to be screwed on easily by hand. Nevertheless, the desired resistance to pull-out is obtained with the edged grains.

The present disclosure relates to the subject matter disclosed in German Application No. P 37 30 686.3 of Sept. 12, 1987, the entire specification of which is incorporated herein by reference.

What is claimed is:

1. Screw-type fitting for holding an elongated member, comprising a threaded socket, a cap nut and at least one elastomeric clamping ring which will be pressed against an outer surface of the elongated member by screwing the cap nut onto the threaded socket, wherein edged grains of hard, electrically insulating material are fixedly arranged on first portions of the inner surface of the clamping ring which will be pressed against the outer surface of the elongated member when the cap nut is screwed onto the threaded socket, said grains digging into the outer surface in a positively connected manner when pressed against the outer surface, second portions of the inner surface of the clamping ring being free of said edged grains.

2. Screw-type fitting as defined in claim 1, wherein said edged grains are adhesively attached to said clamping ring.

3. Screw-type fitting as defined in claim 2, wherein said edged grains are arranged on a carrier material which is attached to said clamping ring.

4. Screw-type fitting as defined in claim 3, wherein said carrier material is an adhesive tape.

5. Screw-type fitting as defined in claim 1, wherein said edged grains are arranged on a carrier material which is attached to said clamping ring.

6. Screw-type fitting as defined in claim 5, wherein said carrier material is an adhesive tape.

7. Screw-type fitting as defined in claim 1, wherein said edged grains are embedded in the elastomeric material of said clamping ring.

8. Screw-type fitting as defined in claim 1, wherein said electrically insulating material is sand.

9. Screw-type fitting as defined in claim 1, wherein the elongated member to be held by the fitting is selected from the following group: a cable, a lead and a hose.

* * * * *